United States Patent
Kato (10) Patent No.: US 11,492,101 B2
(45) Date of Patent: Nov. 8, 2022

(54) AIRFLOW SEPARATION DETECTING METHOD, AIRFLOW SEPARATION POSITION DETECTING METHOD, AIRFLOW SEPARATION DETECTING SYSTEM, AND AIRFLOW SEPARATION POSITION DETECTING SYSTEM

(71) Applicant: SUBARU CORPORATION, Tokyo (JP)

(72) Inventor: Hiroki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 253 days.

(21) Appl. No.: 17/005,970

(22) Filed: Aug. 28, 2020

(65) Prior Publication Data

US 2021/0129978 A1    May 6, 2021

(30) Foreign Application Priority Data

Sep. 30, 2019 (JP) .............................. JP2019-178976

(51) Int. Cl.
    *B64C 23/00*    (2006.01)
    *F15D 1/00*     (2006.01)
    *B64D 45/00*    (2006.01)

(52) U.S. Cl.
    CPC .......... *B64C 23/005* (2013.01); *F15D 1/0075* (2013.01); *B64C 2230/12* (2013.01); *B64D 2045/0085* (2013.01)

(58) Field of Classification Search
    CPC . B64C 23/005; B64C 2230/12; F15D 1/0075; F15D 1/12; B64D 2045/0085; Y02T 50/10
    See application file for complete search history.

(56) References Cited

U.S. PATENT DOCUMENTS

| 7,380,756 B1 * | 6/2008 | Enloe | ................. B64C 23/005 244/175 |
| 9,067,674 B2 * | 6/2015 | Nordin | ................. B82Y 30/00 |
| 2012/0267892 A1 | 10/2012 | Matsuda et al. | |

(Continued)

FOREIGN PATENT DOCUMENTS

| JP | 2012-225296 A | 11/2012 |
| JP | 2019-084897 A | 6/2019 |
| JP | 2019-114505 A | 7/2019 |

*Primary Examiner* — Valentina Xavier
(74) *Attorney, Agent, or Firm* — McDermott Will & Emery LLP (57) ABSTRACT

An airflow separation detecting method includes: applying an alternating-current voltage having a predetermined voltage value to a plasma actuator, the plasma actuator being disposed on a part of a surface of an object; and detecting that separation, from the surface of the object, of an airflow flowing on the surface of the object is occurring, in a case where an absolute value of a temporal variation rate of an electric power consumption value of the plasma actuator or an absolute value of a temporal variation rate of a current value of the plasma actuator is equal to or greater than a predetermined value, the temporal variation rate being a rate of variation relative to time, the electric power consumption value or the current value of the plasma actuator being measured under application of the alternating-current voltage having the predetermined voltage value to the plasma actuator.

16 Claims, 6 Drawing Sheets

(56) References Cited

U.S. PATENT DOCUMENTS

2019/0127051 A1    5/2019  Miyawaki et al.
2019/0193843 A1    6/2019  Kikuchi et al.
2019/0342985 A1*  11/2019  Dadheech ............ H05H 1/2406

* cited by examiner

AIRFLOW SEPARATION DETECTING METHOD, AIRFLOW SEPARATION POSITION DETECTING METHOD, AIRFLOW SEPARATION DETECTING SYSTEM, AND AIRFLOW SEPARATION POSITION DETECTING SYSTEM

CROSS-REFERENCE TO RELATED APPLICATIONS

The present application claims priority from Japanese Patent Application No. 2019-178976 filed on Sep. 30, 2019, the entire contents of which are hereby incorporated by reference.

BACKGROUND

The technology relates to an airflow separation detecting method, an airflow separation position detecting method, an airflow separation detecting system, and an airflow separation position detecting system that each use a plasma actuator.

A plasma actuator includes a pair of electrodes that are so disposed as to be relatively offset from each other with a dielectric in between. The plasma actuator is configured to generate plasma discharge by applying an alternating-current voltage between the pair of electrodes. Activation of such a plasma actuator allows for formation of an air in a direction of the generated plasma discharge.

Recently, a technique is under development using the plasma actuator to control an airflow flowing on a surface of a wing, for example, as disclosed in Japanese Unexamined Patent Application Publication Nos. 2012-225296, 2019-084897, and 2019-114505. In such a technique, the plasma actuator is installed on a part of a surface of: a wing of an aircraft such as an airplane or a helicopter; a wing of a wind power generator; or any other wing. For example, in a case where separation, from a surface of the wing, of an airflow flowing on the surface of the wing is occurring or in a case where such separation is predicted, the plasma actuator disposed on the part of the surface of the wing is activated. This reattaches the airflow, separated from the surface of the wing, onto the surface of the wing, or keeps the airflow attached onto the surface of the wing.

SUMMARY

An aspect of the technology provides an airflow separation detecting method that includes: applying an alternating-current voltage having a predetermined voltage value to a plasma actuator, the plasma actuator being disposed on a part of a surface of an object; and detecting that separation, from the surface of the object, of an airflow flowing on the surface of the object is occurring, in a case where an absolute value of a temporal variation rate of an electric power consumption value of the plasma actuator or an absolute value of a temporal variation rate of a current value of the plasma actuator is equal to or greater than a predetermined value, the temporal variation rate being a rate of variation relative to time, the electric power consumption value of the plasma actuator being measured under application of the alternating-current voltage having the predetermined voltage value to the plasma actuator, the current value of the plasma actuator being measured under the application of the alternating-current voltage having the predetermined voltage value to the plasma actuator.

An aspect of the technology provides an airflow separation detecting method that includes: applying an alternating-current voltage having a predetermined voltage value to each of a first plasma actuator and a second plasma actuator, the first and the second plasma actuators being disposed on a part of a surface of an object in a flowing direction of an airflow on the surface of the object; and detecting that separation, from the surface of the object, of the airflow flowing on the surface of the object is occurring, in a case where a first absolute value is greater than a second absolute value by a predetermined value or more, the first absolute value being an absolute value of a temporal variation rate of an electric power consumption value of the first plasma actuator or an absolute value of a temporal variation rate of a current value of the first plasma actuator at a certain timing, the second absolute value being corresponding one of an absolute value of a temporal variation rate of an electric power consumption value of the second plasma actuator and an absolute value of a temporal variation rate of a current value of the second plasma actuator at the certain timing, the temporal variation rate being a rate of variation relative to time, the electric power consumption values of the respective first and second plasma actuators being measured under application of the alternating-current voltage having the predetermined voltage value to each of the first and the second plasma actuators, the current values of the respective first and second plasma actuators being measured under the application of the alternating-current voltage having the predetermined voltage value to each of the first and the second plasma actuators.

An aspect of the technology provides an airflow separation position detecting method includes detecting, by an airflow separation detecting method, that separation, from a surface of an object, of an airflow flowing on the surface of the object is occurring at a position of a plasma actuator on the basis of which the separation is detected. The airflow separation detecting method includes: applying an alternating-current voltage having a predetermined voltage value to the plasma actuator, the plasma actuator being disposed on a part of the surface of the object; and detecting that separation, from the surface of the object, of the airflow flowing on the surface of the object is occurring, in a case where an absolute value of a temporal variation rate of an electric power consumption value of the plasma actuator or an absolute value of a temporal variation rate of a current value of the plasma actuator is equal to or greater than a predetermined value, the temporal variation rate being a rate of variation relative to time, the electric power consumption value of the plasma actuator being measured under application of the alternating-current voltage having the predetermined voltage value to the plasma actuator, the current value of the plasma actuator being measured under the application of the alternating-current voltage having the predetermined voltage value to the plasma actuator.

An aspect of the technology provides an airflow separation detecting system that includes a plasma actuator and a detecting device. The plasma actuator is disposed on a part of a surface of an object. The detecting device is configured to detect that separation, from the surface of the object, of an airflow flowing on the surface of the object is occurring, in a case where an absolute value of a temporal variation rate of an electric power consumption value of the plasma actuator or an absolute value of a temporal variation rate of a current value of the plasma actuator is equal to or greater than a predetermined value. The temporal variation rate is a rate of variation relative to time. The electric power consumption value of the plasma actuator is measured under application of an alternating-current voltage having a predetermined voltage value to the plasma actuator. The current value of the plasma actuator is measured under the application of the alternating-current voltage having the predetermined voltage value to the plasma actuator.

An aspect of the technology provides an airflow separation detecting system that includes a first plasma actuator, a second plasma actuator, and a detecting device. The first plasma actuator and the second plasma actuator are disposed on a part of a surface of an object in a flowing direction of an airflow on the surface of the object. The detecting device is configured to detect that separation, from the surface of the object, of the airflow flowing on the surface of the object is occurring, in a case where a first absolute value is greater than a second absolute value by a predetermined value or more. The first absolute value is an absolute value of a temporal variation rate of an electric power consumption value of the first plasma actuator or an absolute value of a temporal variation rate of a current value of the first plasma actuator at a certain timing. The second absolute value is corresponding one of an absolute value of a temporal variation rate of an electric power consumption value of the second plasma actuator and an absolute value of a temporal variation rate of a current value of the second plasma actuator at the certain timing. The temporal variation rate is a rate of variation relative to time. The electric power consumption values of the respective first and second plasma actuators are measured under application of an alternating-current voltage having a predetermined voltage value to each of the first and the second plasma actuators. The current values of the respective first and second plasma actuators are measured under the application of the alternating-current voltage having the predetermined voltage value to each of the first and the second plasma actuators.

An aspect of the technology provides an airflow separation position detecting system that includes an airflow separation detecting system. The airflow separation detecting system includes a plasma actuator and a detecting device. The plasma actuator is disposed on a part of a surface of an object. The detecting device is configured to detect that separation, from the surface of the object, of an airflow flowing on the surface of the object is occurring, in a case where an absolute value of a temporal variation rate of an electric power consumption value of the plasma actuator or an absolute value of a temporal variation rate of a current value of the plasma actuator is equal to or greater than a predetermined value. The temporal variation rate is a rate of variation relative to time. The electric power consumption value of the plasma actuator is measured under application of an alternating-current voltage having a predetermined voltage value to the plasma actuator. The current value of the plasma actuator is measured under the application of the alternating-current voltage having the predetermined voltage value to the plasma actuator. The detecting device of the airflow separation detecting system is configured to detect that the separation, from the surface of the object, of the airflow flowing on the surface of the object is occurring at a position of the plasma actuator on a basis of which the separation is detected.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

In order to determine whether separation of an airflow from a surface of a wing is occurring, for example, a value measured by a sensor such as a flow-velocity sensor or a pressure sensor has been used. Such a sensor may be newly installed on the wing or may have been installed in an aircraft, etc. in advance.

Such cases, however, can involve an issue. For example, in a case of newly installing the sensor, the installed sensor can exert an aerodynamic influence. In a case of using the already-installed sensor, a position of the sensor can be inappropriate to detect separation of an airflow.

It is desirable to provide an airflow separation detecting method, an airflow separation position detecting method, an airflow separation detecting system, and an airflow separation position detecting system that make it possible to detect, for example, whether separation of an airflow from a surface of an object is occurring, without newly installing a sensor on the object or using an already-installed sensor.

In the following, an airflow separation detecting method, an airflow separation position detecting method, an airflow separation detecting system, and an airflow separation position detecting system according to some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

According to the example embodiments of the technology, detection of separation of an airflow flowing on a surface of a wing or detection of a position of the separation is performed without newly installing, on the wing, a sensor such as a flow-velocity sensor or a pressure sensor for the airflow, or without using such a sensor installed on an aircraft, etc. in advance. According to the example embodiments, a plasma actuator disposed on a part of the surface of the wing is used, as described below. The separation of the airflow from the surface of the wing or the position of the separation of the airflow are detected on the basis of an electric power consumption value or a current value of the plasma actuator.

In the following, described is an example case where the plasma actuator is disposed on a part of a surface of a wing of an aircraft; however, this is non-limiting. The airflow separation detecting method, the airflow separation position detecting method, the airflow separation detecting system, and the airflow separation position detecting system according to the example embodiments of the technology are applicable to: detection of separation of an airflow flowing on a surface of a wing of a wind power generator; detection of a position of the separation of such an airflow; detection of separation of an airflow flowing on a surface of an object other than a wing; and detection of a position of the separation of such an airflow.

Moreover, in the following, described is an example case where the plasma actuator is disposed on a part of the surface of the wing, and the plasma actuator is activated when: separation, from the surface of the wing, of the airflow flowing on the surface of the wing is occurring; or such separation is predicted, to thereby reattach the separated airflow onto the surface of the wing or to thereby keep the airflow attached to the surface of the wing. However, the example embodiments of the technology are not limited to the case where the plasma actuator is disposed on a part of the surface of the wing or any other object in order to achieve the above.

[Plasma Actuator]

Figure 1:
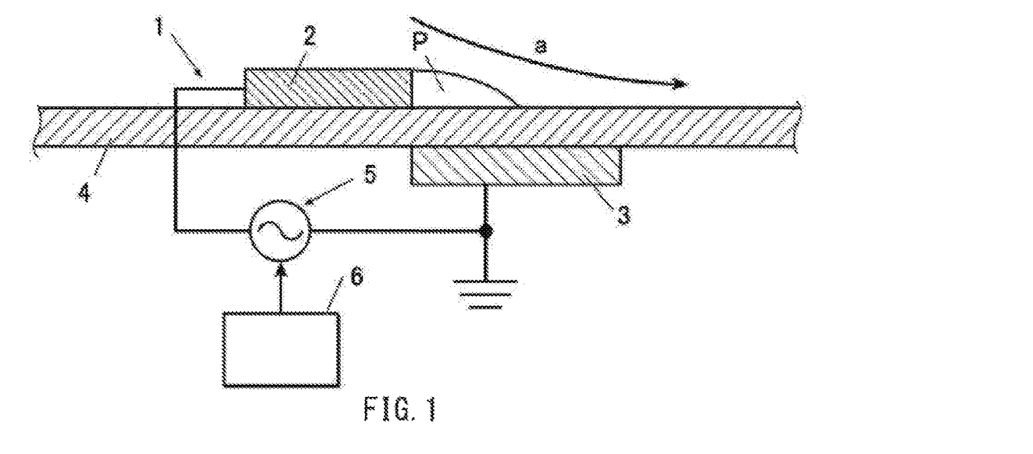
FIG. 1 is a schematic cross-sectional view of an example of a configuration, etc. of a plasma actuator.

A description is given below of a configuration, a control method, etc. of the plasma actuator. FIG. 1 is a schematic cross-sectional view of an example of the configuration, etc. of the plasma actuator.

Referring to FIG. 1, a plasma actuator 1 may include a first electrode 2, a second electrode 3, a dielectric 4, an alternating-current power supply 5, and a controller 6 that controls the alternating-current power supply 5. The first electrode 2 and the second electrode 3 may be disposed with the dielectric 4 interposed in between. In addition, the first electrode 2 and the second electrode 3 may be offset relative to each other in an extending direction of the dielectric 4.

The second electrode 3 may be grounded. The alternating-current power supply 5 may apply an alternating-current voltage between the first electrode 2 and the second electrode 3.

When the controller 6 activates the alternating-current power supply 5 to apply a high alternating-current voltage at a high frequency between the first electrode 2 and the second electrode 3, plasma P may be so generated as to spout from the first electrode 2 at a position, on a surface of the dielectric 4, that is on a lateral side of the first electrode 2 and corresponds to a position of the second electrode 3. The plasma P may include an electron and a positive ion. The sprouting of the plasma P may induce a flow "a" of air that flows toward the surface of the dielectric 4 and flows on the surface of the dielectric 4 in a sprouting direction of the plasma P (see an arrow "a" illustrated in FIG. 1).

That is, activation of the plasma actuator 1 (i.e., application of the alternating-current voltage at the high frequency between the first electrode 2 and the second electrode 3) may allow for generation of the plasma P on the lateral side of the first electrode 2. Such sprouting of the plasma P may allow for generation of the flow "a" of the air flowing on the surface of the dielectric 4.

With use of the plasma actuator 1, the flow "a" of the air may be thus generated on a surface of a wing. This is usable, for example, in a case where separation, from the surface of the wing, of an airflow flowing on the surface of the wing is occurring, as described above. In such a case, the plasma actuator 1 may be activated to cause the separated airflow to be reattached onto the surface of the wing.

Figure 2A:
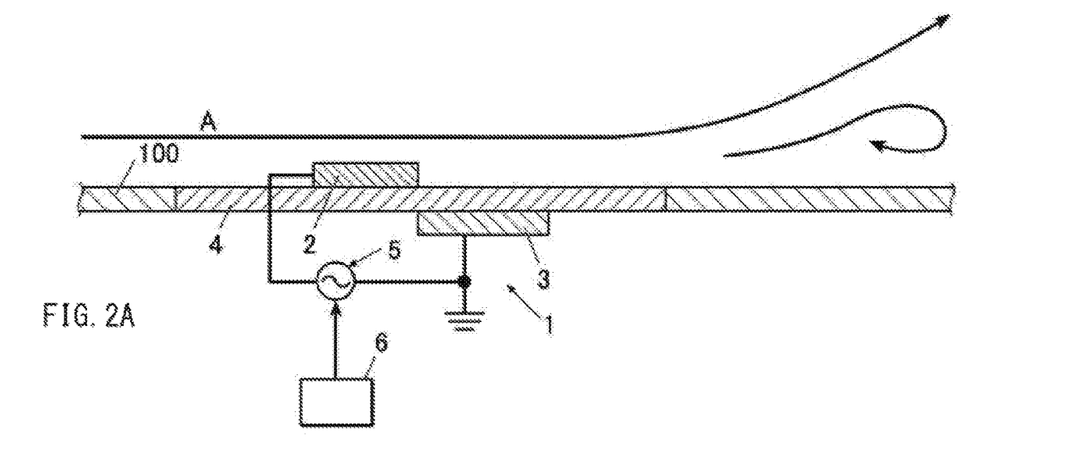
FIG. 2A is a diagram illustrating an example of a state where separation of an airflow from a surface of a wing is occurring.
Figure 2B:
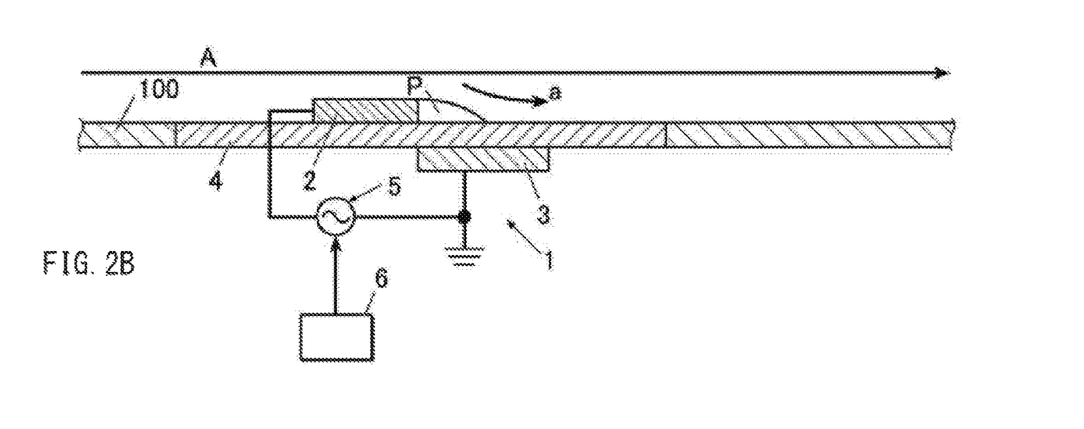
FIG. 2B is a diagram illustrating an example of a state where the separated airflow is reattached onto the surface of the wing.

That is, in a case illustrated in FIG. 2A where separation, from a surface of a wing 100, of an airflow A flowing on the surface of the wing 100 is occurring, the plasma actuator 1 may be activated on an upstream side of a position of the separation of the airflow A (i.e., on the upstream side in a flowing direction of the airflow A) to generate the plasma P on an downstream lateral side of the first electrode 2, as illustrated in FIG. 2B. This may generate the flow "a" of the air, allowing the separated airflow A to be reattached onto the surface of the wing 100.

With use of the plasma actuator 1, the airflow A flowing on the surface of the wing 100 is thus allowed to be controlled.

Figure 3A:
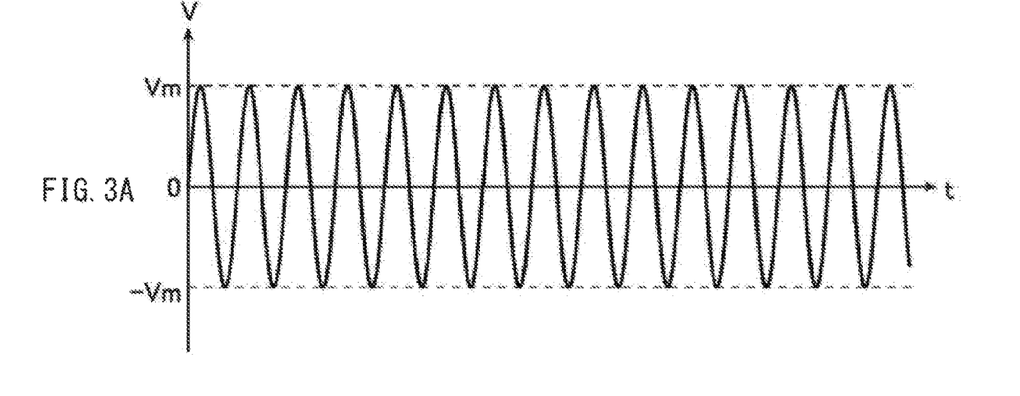
FIG. 3A is a diagram illustrating an example of a regular waveform of an alternating-current voltage.

As an alternating-current voltage V to be applied between the first electrode 2 and the second electrode 3 by the alternating-current power supply 5, for example, a regular alternating-current voltage illustrated in FIG. 3A may be applied to thereby continuously generate the plasma P. According, however, to a study conducted by the inventor, it is found that application of a burst-waveform alternating-current voltage illustrated in FIG. 3B as the alternating-current voltage V allows for appropriate attachment of the airflow A onto the surface of the wing 100 not only in a case where the airflow A has a low flow velocity but also in a case where the airflow A has a high flow velocity.

Figure 3B:
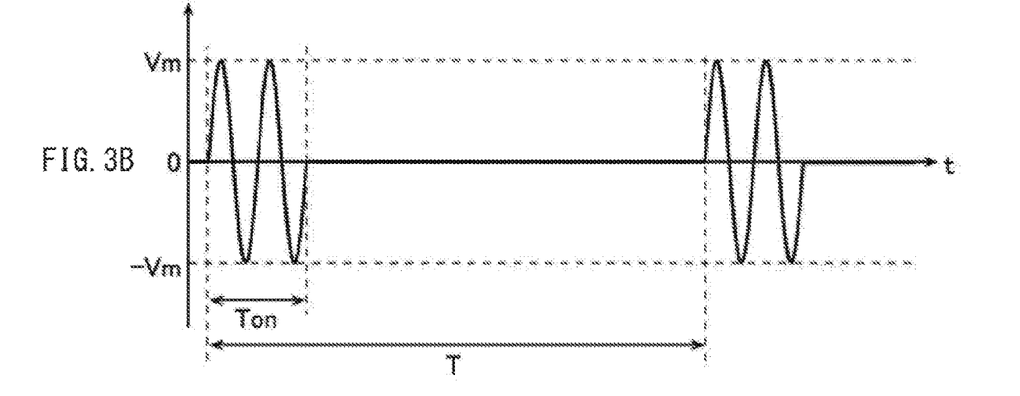
FIG. 3B is a diagram illustrating an example of a burst waveform of an alternating-current voltage.

Here, a burst waveform refers to a waveform that involves a positive-amplitude period and a zero-amplitude period that repeatedly appear in a constant cycle (a burst cycle) T, as illustrated in FIG. 3B. The positive-amplitude period refers to a period that has an amplitude which is not zero and may have a maximum amplitude of Vm. The plasma P may be generated in the positive-amplitude period but may not be generated in the zero-amplitude period.

Further, according to the study conducted by the inventor, it is found that an effect of causing the airflow A to be attached onto the surface of the wing 100 by the plasma actuator 1 may greatly depend on a burst frequency $f (=1/T)$.

That is, for example, in a case where the separation, from the surface of the wing 100, of the airflow A flowing on the surface of the wing 100 is occurring or in a case where such separation of the airflow A is predicted, appropriate adjustment of the burst frequency f or the burst cycle T may effectively reattach the airflow A, separated from the surface of the wing 100, onto the surface of the wing 100, or may effectively keep the airflow A attached onto the surface of the wing 100 by activating the plasma actuator 1.

The controller 6 may adjust factors including, without limitation: the waveform of the alternating-current voltage V to be applied between the first electrode 2 and the second electrode 3 by the alternating-current power supply 5; the burst cycle T (or the burst frequency f); and a positive-amplitude period Ton. The positive amplitude period Ton may encompass a case where Ton=T, i.e., a case of a regular alternating-current voltage. The maximum amplitude Vm of the alternating-current voltage V may not be constant over time, and may be varied over time.

[Airflow Separation Detecting Method, Airflow Separation Detecting System, Airflow Separation Position Detecting Method, and Airflow Separation Position Detecting System]

Next, a description is given of an airflow separation detecting system and an airflow separation position detecting system according to some example embodiments of the technology that each use the plasma actuator 1 described above.

Note that the following description of the airflow separation detecting system and the airflow separation position detecting system also describes the airflow separation detecting method and the airflow separation position detecting method according to some example embodiments of the technology. However, the airflow separation detecting method and the airflow separation position detecting method are not limited to a later-described case where a detecting device 7 detects the separation of the airflow A, etc. Further, the following description refers to an example case where the detecting device 7 is provided separately from the controller 6 for the alternating-current power supply 5. However, in one example embodiment, the detecting device 7 and the controller 6 may be integrated with each other.

Further, in the following, the wing 100 described above is generalized as an object 100.

First Example Embodiment

[Airflow Separation Detecting Method and Airflow Separation Detecting System]

Figure 4:
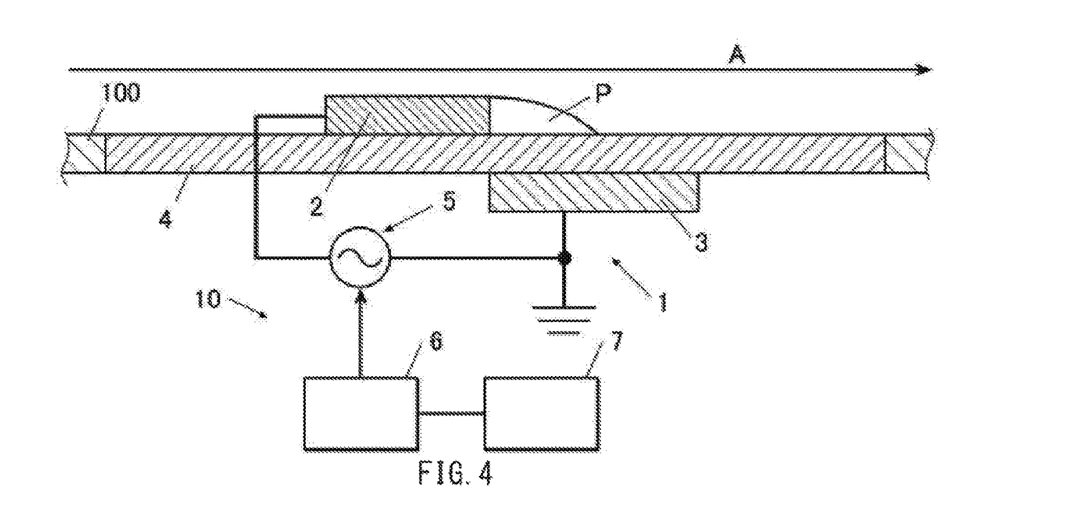
FIG. 4 is a diagram illustrating an example of a configuration of an airflow separation detecting system according to one example embodiment.

FIG. 4 illustrates a configuration of an airflow separation detecting system according to a first example embodiment.

Note that, in FIG. 4, the first electrode 2 of the plasma actuator 1 is illustrated with a great thickness for illustration purpose; however, the actual first electrode 2 may have an extremely-small thickness, for example, as a film, in order to prevent the first electrode 2 from influencing the airflow A flowing on the surface of the object 100.

An airflow separation detecting system 10 according to the first example embodiment includes the plasma actuator 1 described above and the detecting device 7. The plasma actuator 1 is disposed on a part of a surface of the object 100. The part, of the surface, on which the plasma actuator 1 is disposed is hereinafter sometimes referred to as a "surface part". The detecting device 7 may be coupled to the controller 6 for the alternating-current power supply 5. In one example, the detecting device 7 may be directly coupled to the alternating-current power supply 5 without the controller 6 coupled in between.

The detecting device 7 may include a memory and a computer. The memory may hold a processor program, and allow a processor to execute the program. The computer may be coupled to one or more plasma actuators, and determine whether separation of an airflow is occurring, on the basis of an absolute value of a temporal variation rate of an electric power consumption value of the plasma actuator 1 or an absolute value of a temporal variation rate of a current value of the plasma actuator 1. The temporal variation rate refers to a rate of variation relative to time. Non-limiting examples of the computer may include a microcomputer. The detecting device 7 may detect whether the separation, from the surface of the object 100, of the airflow A flowing on the surface of the object 100 is occurring. In the following, a description is given of a case where the regular alternating-current voltage having the maximum amplitude Vm that is constant over time illustrated in FIG. 3A is applied to the plasma actuator 1 for description purpose. However, the description is similarly applicable to a case where an alternating-current voltage having any other waveform such as the burst-waveform alternating-current voltage illustrated in FIG. 3B is applied to the plasma actuator 1.

An electric power consumption value p of the alternating-current power supply 5 of the plasma actuator 1 disposed on the surface part of the object 100 may be measured. In a case where the airflow A flowing on the surface of the object 100 is attached onto the surface of the object 100 at a position of the plasma actuator 1 as illustrated in FIG. 4, the electric power consumption value p may be in a substantially-constant state as illustrated in a part α in FIG. 5, if a factor such as a flow velocity of the airflow A does not vary.

Figure 5:
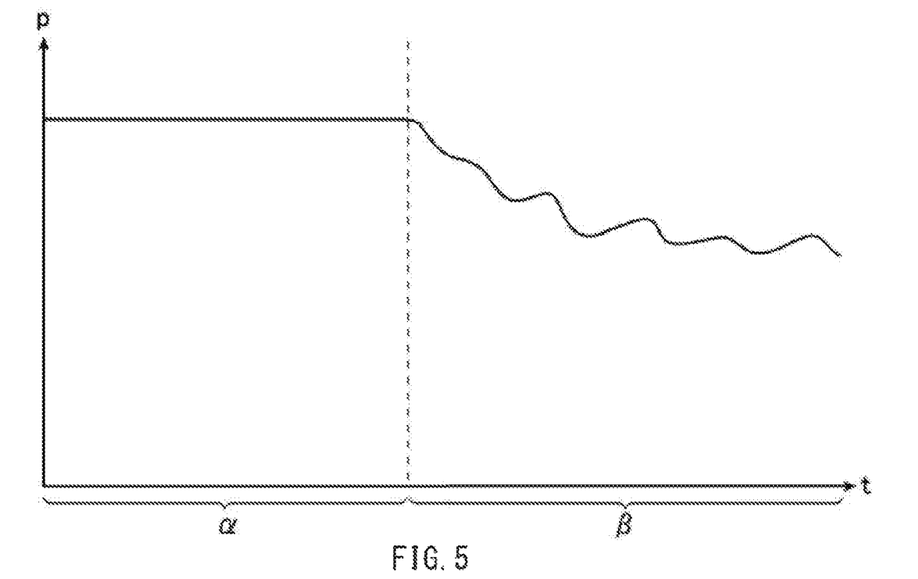
FIG. 5 is a diagram illustrating examples of a substantially-constant state and a radical variation state of an electric power consumption value of the plasma actuator.
Figure 6:
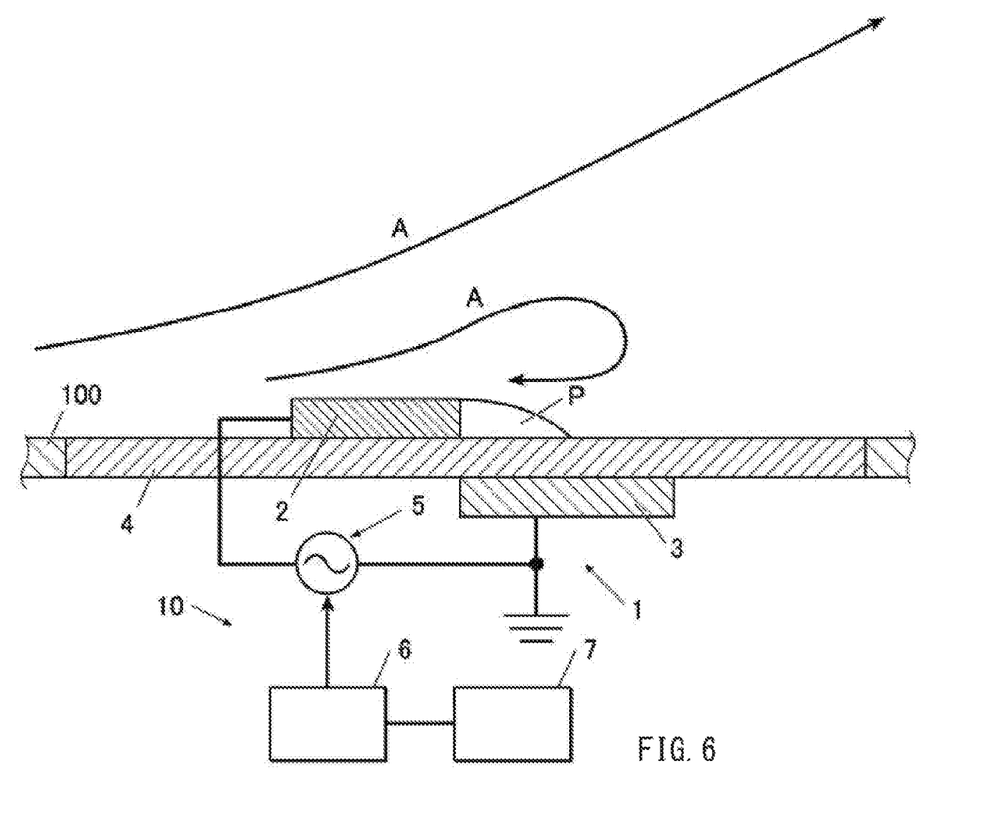
FIG. 6 is a diagram illustrating an example of a state where separation of an airflow from a surface of an object is occurring at a position of the plasma actuator.

However, in a case where the separation of the airflow A from the surface of the object 100 is occurring at the position of the plasma actuator 1 as illustrated in FIG. 6, the electric power consumption value p of the plasma actuator 1 can sometimes vary radically as illustrated in part β in FIG. 5.

A reason of occurrence of such a phenomenon is not completely clear; however, the following is one possible reason.

That is, in a case where the airflow A is attached onto the surface of the object 100 as illustrated in FIG. 4, the airflow A flows stably, allowing a flow rate of the airflow A to be constant. For example, in a case where a speed of an aircraft varies, the speed of the aircraft does not vary radically in a short moment but varies relatively gradually. Therefore, variation in the flow rate of the airflow A on the surface of the wing, corresponding to the object 100, of the aircraft is also relatively gradual.

In contrast, in a case where the separation of the airflow A from the surface of the object 100 is occurring as illustrated in FIG. 6, the airflow A can be sometimes disturbed. For example, part of the airflow A can flow in an opposite direction. Therefore, the airflow A becomes unstable, causing the flow rate of the airflow A to vary relatively radically.

A high alternating-current voltage may be applied at a high frequency to the plasma actuator 1 as described above. Such a high alternating-current voltage applied at the high frequency to the plasma actuator 1 may cause molecules in the airflow A to be ionized in the vicinity of the plasma actuator 1.

When the molecules in the airflow A are ionized, an apparent current value of the plasma actuator 1 may increase, and the electric power consumption value p of the plasma actuator 1 may also increase.

Under such a situation, in the case where the airflow A is attached onto the surface of the object 100, the airflow A may flow stably and the flow rate of the airflow A may be stable, as described above. Therefore, an amount of the ionized molecules may be constant, or even if the amount of the ionized molecules varies, the variation may be gradual. Accordingly, in the case where the airflow A is attached onto the surface of the object 100 at the position of the plasma actuator 1, the measured electric power consumption value p of the plasma actuator 1 may be substantially constant, or even if the measured electric power consumption value p varies, the variation may be gradual.

In contrast, in the case where the separation of the airflow A from the surface of the object 100 is occurring at the position of the plasma actuator 1, the flow rate of the airflow A may vary relatively radically, as described above. Therefore, the amount of the molecules ionized as a result of the high alternating-current voltage applied to the plasma actuator 1 may vary relatively radically. It can be considered that this causes the measured electric power consumption value p of the plasma actuator 1 to vary relatively radically as a result.

According to the first example embodiment, the above-described phenomenon may be utilized to detect that the separation, from the surface of the object 100, of the airflow A flowing on the surface of the object 100 is occurring, in a case where an absolute value of a temporal variation rate of the electric power consumption value p of the plasma actuator 1 becomes a predetermined value or greater. The temporal variation rate refers to a variation rate relative to time. The electric power consumption value p of the plasma actuator 1 may be measured under application of the alternating-current voltage V having a predetermined voltage value to the plasma actuator 1 disposed on the surface part of the object 100. The predetermined voltage value may be, for example, the maximum amplitude Vm described above.

Note that, in one example embodiment, a current value i of the plasma actuator 1 may be measured instead of the electric power consumption value p of the plasma actuator 1. The current value i may involve contribution of the ionized molecules described above. In the airflow separation detecting system 10, the detecting device 7 may perform such a process.

The above-described predetermined value may be appropriately set to a value that allows for distinction between a state where the airflow A is attached onto the surface of the object 100 and the state where the separation of the airflow A from the surface of the object 100 is occurring. Such a value allowing for the distinction may be appropriately set on the basis of an experiment, a simulation, etc. conducted in advance.

As described above, according to the airflow separation detecting method or the airflow separation detecting system 10 of the first example embodiment, it is possible to detect whether the separation, from the surface of the object 100, of the airflow A flowing on the surface of the object 100 is occurring, by only monitoring the temporal variation rate of the electric power consumption value p or the current value i of the plasma actuator 1 or the absolute value of the temporal variation rate.

Therefore, according to the airflow separation detecting method or the airflow separation detecting system 10 of the first example embodiment, it is possible to properly detect whether the separation of the airflow A from the surface of the object 100 is occurring, without newly installing a sensor such as a flow-velocity sensor or a pressure sensor on the object 100 or without using an already-installed sensor.

[Airflow Separation Position Detecting Method and Airflow Separation Position Detecting System]

Moreover, in a case where the absolute value of the temporal variation rate of the electric power consumption value p of the plasma actuator 1 becomes the predetermined value or greater in the airflow separation detecting method or the airflow separation detecting system 10 described above, it is possible to detect that the separation of the airflow A from the surface of the object 100 is occurring at least at a position, on the surface of the object 100, at which the plasma actuator 1 of interest is disposed. The plasma actuator 1 of interest may refer to the plasma actuator 1 on the basis of which the separation of the airflow A from the surface of the object 100 is detected with use of the airflow separation detecting method or the airflow separation detecting system 10 described above.

Accordingly, it is also possible to perform an airflow separation position detection with use of the airflow separation detecting method according to the first example embodiment (the airflow separation position detecting method). Further, the airflow separation detecting system 10 according to the first example embodiment may also serve as an airflow separation position detecting system.

Such a configuration makes it possible to properly detect a position of the separation of the airflow A from the surface of the object 100, with use of only the plasma actuator 1 and without using any other sensor.

Note that the detection of the position of the separation of the airflow A in the airflow separation detecting system 10 may be performed by the detecting device 7 described above, or may be performed by any device other than the detecting device 7.

Second Example Embodiment

[Airflow Separation Detecting Method and Airflow Separation Detecting System]

The first example embodiment has been described above referring to a case where the single plasma actuator 1 may be used to detect the separation of the airflow A; however, this is non-limiting. According to a second example embodiment, two or more plasma actuators 1 may be used to detect the separation of the airflow A. In this case, referring to FIG. 7, the plasma actuators 1 may be disposed side by side on the surface part of the object 100 (e.g., the wing 100 of an aircraft 101) in a flowing direction of the airflow A on the surface of the object 100. Referring to FIG. 8, the plasma actuators 1 may each have a configuration similar to that according to the first example embodiment. A detecting device 8, however, of an airflow separation detecting system 20 according to the second example embodiment may be coupled to the controller 6 for the alternating-current power supply 5 of each of the plasma actuators 1.

Note that, regarding the second example embodiment, the detecting device 8 may be directly coupled to the alternating-current power supply 5 as well in one example.

Figure 7:
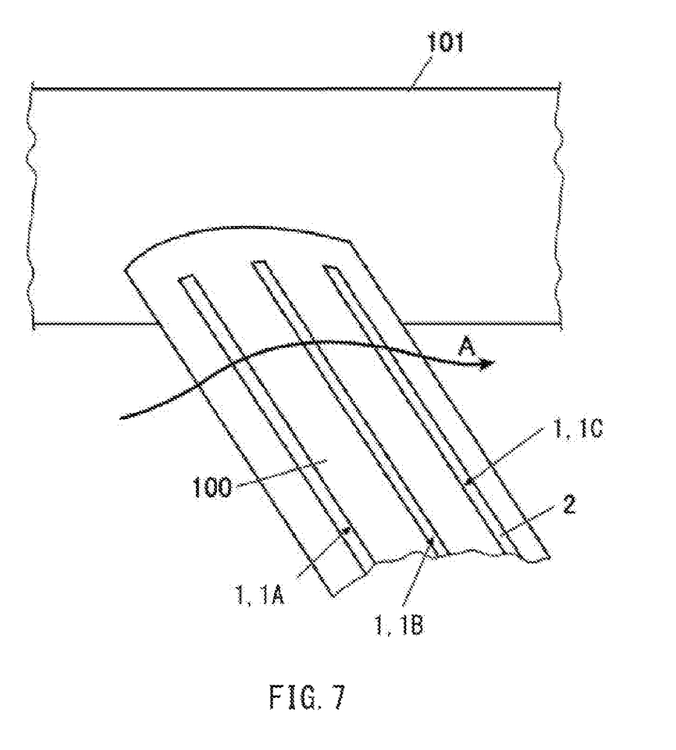
FIG. 7 is a diagram illustrating an example in which two or more plasma actuators are disposed side by side on a part of the surface of the object in a flowing direction of the airflow on the surface of the object.
Figure 8:
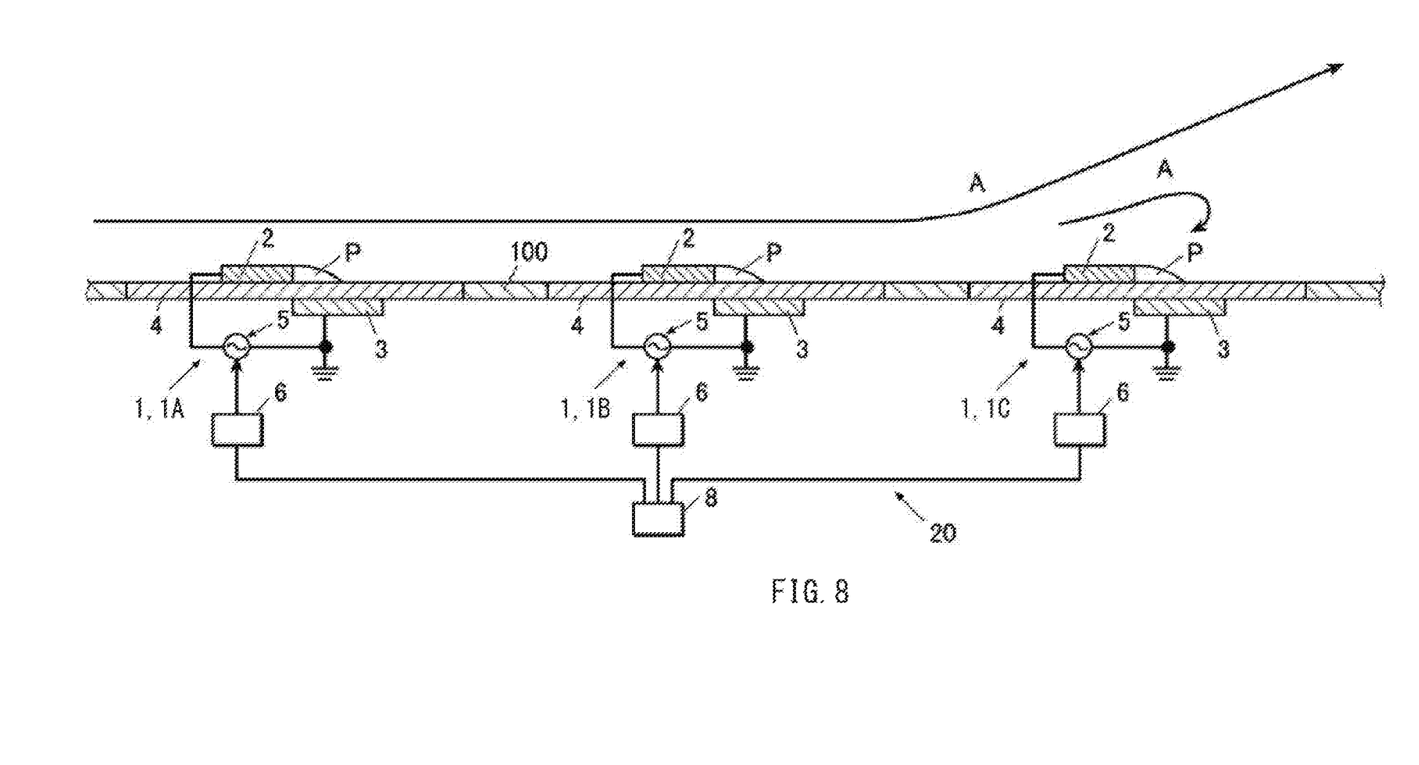
FIG. 8 is a diagram illustrating an example of a configuration of an airflow separation detecting system according to one example embodiment.

FIGS. 7 and 8 illustrate a case where three plasma actuators 1, i.e., plasma actuators 1A, 1B, and 1C, are disposed in the flowing direction of the airflow A on the surface of the object 100, and the following description refers to the illustrated case; however, the number of the plasma actuators 1 disposed in the flowing direction of the airflow A on the surface of the object 100 is not limited to three. In one example embodiment, two plasma actuators 1 or four or more plasma actuators 1 may be disposed in the flowing direction of the airflow A on the surface of the object 100.

According to the second example embodiment, as with the first example embodiment, it may be detected that the separation, from the surface of the object 100, of the airflow A flowing on the surface of the object 100 is occurring, in a case where an absolute value of a temporal variation rate of an electric power consumption value p or a current value i of any of the plasma actuators 1 becomes the predetermined value or greater. The electric power consumption value p or the current value i of each of the plasma actuators 1 may be measured under application of the alternating-current voltage V having the predetermined voltage value to each of the plasma actuators 1. The predetermined voltage value may be, for example, the maximum amplitude Vm described above.

In a case of having such a configuration, the detecting device 8 may monitor the electric power consumption values p or the current values i of the respective plasma actuators 1 independently of each other.

In one example, the airflow separation detecting method or the airflow separation detecting system 20 according to the second example embodiment may have the following configuration which utilizes that the two or more plasma actuators 1 are provided.

That is, as described above, the two or more plasma actuators 1 may be disposed on the surface part of the object 100 in the flowing direction of the airflow A on the surface of the object 100. The alternating-current voltage V having the predetermined voltage value may be applied to each of the plasma actuators 1. In such a situation, the electric power consumption value p or the current value i of each of the plasma actuators 1 may be measured. It may be detected that the separation, from the surface of the object 100, of the airflow A flowing on the surface of the object 100 is occurring: in a case where an absolute value of a temporal variation rate of the electric power consumption value p of one or more of the plasma actuators 1 at a certain timing is greater, by a predetermined value or more, than an absolute value of a temporal variation rate of the electric power consumption value p of the others of the plasma actuators 1 at the certain timing; or in a case where an absolute value of a temporal variation rate of the current value i of one or more of the plasma actuators 1 at a certain timing is greater, by a predetermined value or more, than an absolute value of a temporal variation rate of the current value i of the others of the plasma actuators 1 at the certain timing.

This is described below with reference to a specific but non-limiting example. Note that, although the following description refers to a case of measuring the electric power consumption value p of each of the plasma actuators 1, a configuration may be adopted that measures the current value i of each of the plasma actuators 1.

The plasma actuators 1A, 1B, and 1C disposed on the surface part of the object 100 may respectively have electric power consumption values pa, pb, and pc. In a case where the airflow A flowing on the surface of the object 100 is attached onto the surface of the object 100 at positions where the respective plasma actuators 1A, 1B, and 1C are disposed, the electric power consumption values pa, pb, and pc may be substantially constant as illustrated in a part γ in FIG. 9, as with the case according to the first example embodiment illustrated in FIG. 5. In such a case, even if the measured electric power consumption values pa, pb, and pc vary, the variation may be gradual.

Figure 9:
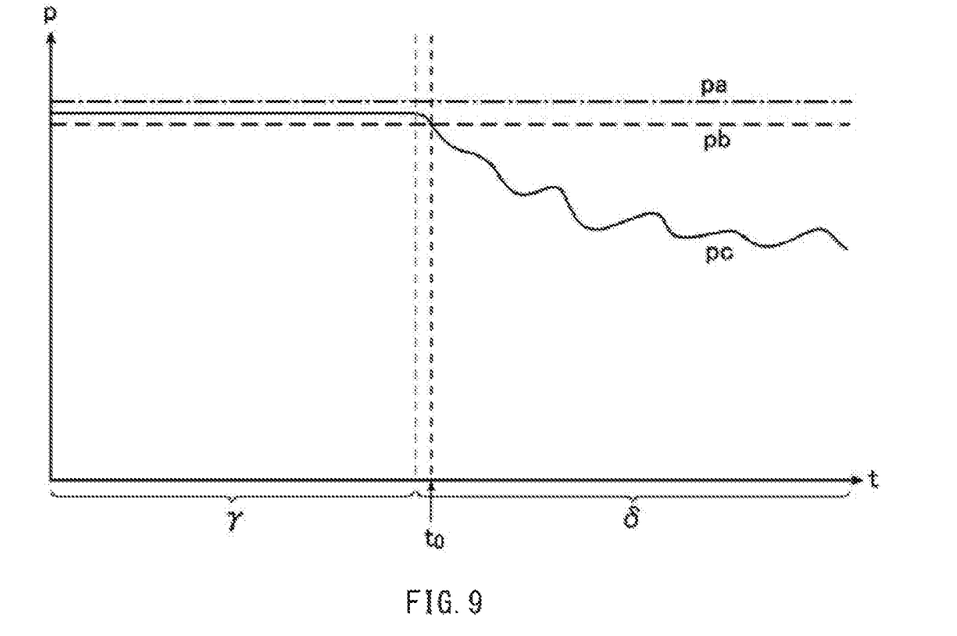
FIG. 9 is a diagram illustrating an example of transition over time of electric power consumption values of the respective plasma actuators in a case where the separation of the airflow is occurring at a position of one of the plasma actuators.

In this state, for example, in a case where the separation of the airflow A from the surface of the object 100 is occurring at the position of the plasma actuator 1C as illustrated in FIG. 8, the electric power consumption value pc of the plasma actuator 1C can sometimes vary radically as illustrated in part δ in FIG. 9.

In contrast, in a case where the airflow A is kept being attached onto the surface of the object 100 at the positions of the respective plasma actuators 1A and 1B other than the plasma actuator 1C as illustrated in FIG. 8, the electric power consumption values pa and pb of the respective plasma actuators 1A and 1B may be kept substantially constant, or even if the measured electric power consumption values pa and pb vary, the variation may be gradual.

Accordingly, in this case, when an absolute value of the temporal variation rate of the electric power consumption value pc of the plasma actuator 1C at a certain timing (e.g., at a timing to in FIG. 9) is compared with absolute values of the temporal variation rates of the electric power consumption values pa and pb of the other respective plasma actuators 1A and the 1B at the same timing, the absolute value of the temporal variation rate of the electric power consumption value pc of the plasma actuator 1C may be considerably greater than the absolute values of the temporal variation rates of the electric power consumption values pa and pb of the respective plasma actuators 1A and the 1B.

Accordingly, it may be detected that the separation, from the surface of the object 100, of the airflow A flowing on the surface of the object 100 is occurring, in a case where the absolute value of the temporal variation rate of the electric power consumption value pc of the plasma actuator 1C at a certain timing is greater, by a predetermined value or more, than the absolute values of the temporal variation rates of the electric power consumption values pa and pb of the other respective plasma actuators 1A and the 1B at the same timing. This makes it possible to ensure the detection of the separation of the airflow A.

Figure 10:
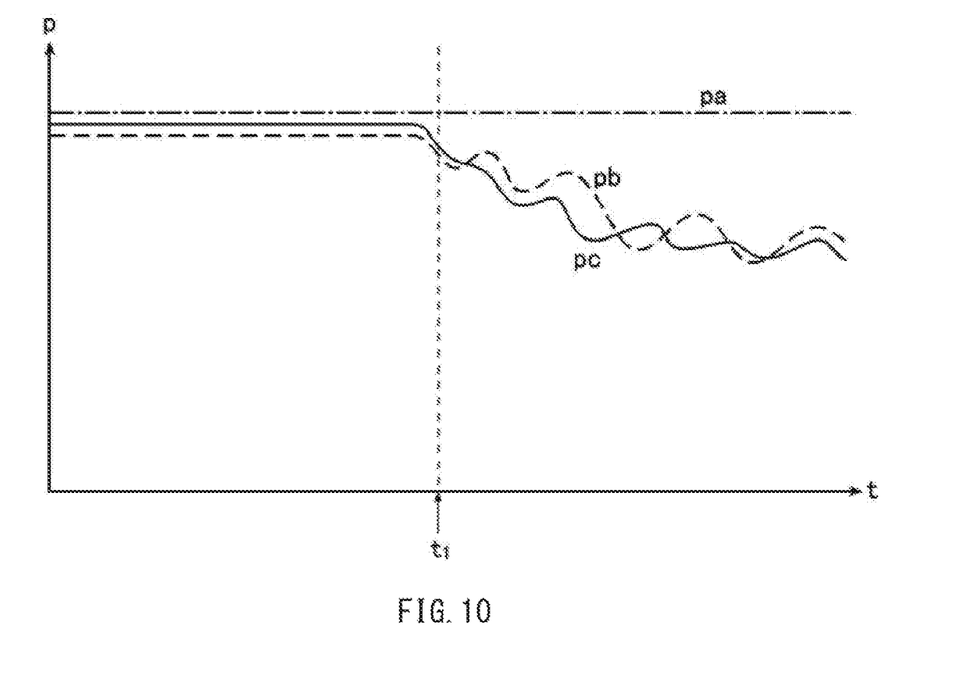
FIG. 10 is a diagram illustrating an example of transition over time of the electric power consumption values of the respective plasma actuators in a case where the separation of the airflow is occurring at positions of two of the plasma actuators.

The above description has been given of the example case illustrated in FIG. 8 where the separation of the airflow A from the surface of the object 100 is occurring only at the position of the plasma actuator 1C. In another example case where the separation of the airflow A from the surface of the object 100 is occurring at both the positions of the plasma actuators 1B and 1C at the same time, the electric power consumption values pa, pb, and pc may be in respective states as illustrated in FIG. 10, for example. That is, the electric power consumption value pa of the plasma actuator 1A other than the plasma actuators 1B and 1C may be kept substantially constant or may be kept in a gradual variation state. In contrast, the electric power consumption values pb and pc of the respective plasma actuators 1B and 1C may be in a radical variation state.

Accordingly, comparing the absolute values of the temporal variation rates of the electric power consumption values pb and pc of the respective plasma actuators 1B and 1C at a certain timing (e.g., a timing $t_1$ in FIG. 10) with the absolute value of the temporal variation rate of the electric power consumption value pa of the plasma actuator 1A other than the plasma actuators 1B and 1C at the same timing makes it possible to ensure the detection of the separation of the airflow A.

As described above, according to the airflow separation detecting method or the airflow separation detecting system 20 of the second example embodiment, it is possible to detect whether the separation, from the surface of the object 100, of the airflow A flowing on the surface of the object 100 is occurring by only monitoring the temporal variation rate of the electric power consumption value p or the current value i of each of the plasma actuators 1 or the absolute value thereof.

Therefore, according to the airflow separation detecting method or the airflow separation detecting system 20 of the second example embodiment, it is possible to properly detect whether the separation of the airflow A from the surface of the object 100 is occurring, without newly installing a sensor such as a flow-velocity sensor or a pressure sensor on the object 100 or without using an already-installed sensor.

[Airflow Separation Position Detecting Method and Airflow Separation Position Detecting System]

Moreover, as can be derived from the description above, the airflow separation detecting method or the airflow separation detecting system 20 according to the second example embodiment may be used to detect that the separation of the airflow A from the surface of the object 100 is occurring at the position of which of the plasma actuators 1. In the example illustrated in FIG. 8, it may be detected that the separation of the airflow A from the surface of the object 100 is occurring at the position of the plasma actuator 1C.

That is, in a case where the absolute value of the temporal variation rate of the electric power consumption value p or the current value i of the plasma actuator 1 at a certain timing is greater, by a predetermined value or more, than the absolute value of the temporal variation rate of the electric power consumption value p or the current value i of another plasma actuator 1 at the same timing, it is possible to detect that the separation of the airflow A from the surface of the object 100 is occurring at a position, on the surface of the object 100, where the plasma actuator 1 of the interest is disposed. The plasma actuator 1 of interest may refer to the plasma actuator 1, having the greater absolute value, on the basis of which the separation of the airflow A from the surface of the object 100 is detected with the use of the airflow separation detecting method or the airflow separation detecting system 20 described above.

Accordingly, it is also possible to detect a position of separation of an airflow with use of the airflow separation detecting method according to the second example embodiment (the airflow separation position detecting method). Further, the airflow separation detecting system 20 according to the second example embodiment may also serve as the airflow separation position detecting system.

Such a configuration makes it possible to properly detect the position of the separation of the airflow A from the surface of the object 100, with use of only the two or more plasma actuators 1 and without using any other sensor.

Note that the detection of the position of the separation of the airflow A in the airflow separation detecting system 20 may be performed by the detecting device 8 described above with reference to FIG. 8, or may be performed by any device other than the detecting device 8.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

Each of the detecting device 7 illustrated in FIG. 1 and the detecting device 8 illustrated in FIG. 8 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the detecting device 7 illustrated in FIG. 1 and the detecting device 8 illustrated in FIG. 8. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the detecting device 7 illustrated in FIG. 1 and the detecting device 8 illustrated in FIG. 8.

The invention claimed is:

1. An airflow separation detecting method comprising:
    applying an alternating-current voltage having a predetermined voltage value to a plasma actuator, the plasma actuator being disposed on a part of a surface of an object; and
    detecting that separation, from the surface of the object, of an airflow flowing on the surface of the object is occurring, in a case where an absolute value of a temporal variation rate of an electric power consumption value of the plasma actuator or an absolute value of a temporal variation rate of a current value of the plasma actuator is equal to or greater than a predetermined value, the temporal variation rate being a rate of variation relative to time, the electric power consumption value of the plasma actuator being measured under application of the alternating-current voltage having the predetermined voltage value to the plasma actuator, the current value of the plasma actuator being measured under the application of the alternating-current voltage having the predetermined voltage value to the plasma actuator.

2. An airflow separation detecting method comprising:
    applying an alternating-current voltage having a predetermined voltage value to each of a first plasma actuator and a second plasma actuator, the first and the second plasma actuators being disposed on a part of a surface of an object in a flowing direction of an airflow on the surface of the object; and
    detecting that separation, from the surface of the object, of the airflow flowing on the surface of the object is occurring, in a case where a first absolute value is greater than a second absolute value by a predetermined value or more, the first absolute value being an absolute value of a temporal variation rate of an electric power consumption value of the first plasma actuator or an absolute value of a temporal variation rate of a current value of the first plasma actuator at a certain timing, the second absolute value being corresponding one of an absolute value of a temporal variation rate of an electric power consumption value of the second plasma actuator and an absolute value of a temporal variation rate of a current value of the second plasma actuator at the certain timing, the temporal variation rate being a rate of variation relative to time, the electric power consumption values of the respective first and second plasma actuators being measured under application of the alternating-current voltage having the predetermined voltage value to each of the first and the second plasma actuators, the current values of the respective first and second plasma actuators being measured under the application of the alternating-current voltage having the predetermined voltage value to each of the first and the second plasma actuators.

3. The airflow separation detecting method according to claim 1, wherein the object comprises a wing of an aircraft.

4. The airflow separation detecting method according to claim 2, wherein the object comprises a wing of an aircraft.

5. An airflow separation position detecting method comprising detecting, by the airflow separation detecting method according to claim 1, that the separation, from the surface of the object, of the airflow flowing on the surface of the object is occurring at a position of the plasma actuator on a basis of which the separation is detected.

6. An airflow separation position detecting method comprising detecting, by the airflow separation detecting method according to claim 2, that the separation, from the surface of the object, of the airflow flowing on the surface of the object is occurring at a position of the plasma actuator on a basis of which the separation is detected.

7. An airflow separation position detecting method comprising detecting, by the airflow separation detecting method according to claim 3, that the separation, from the surface of the object, of the airflow flowing on the surface of the object is occurring at a position of the plasma actuator on a basis of which the separation is detected.

8. An airflow separation position detecting method comprising detecting, by the airflow separation detecting method according to claim 4, that the separation, from the surface of the object, of the airflow flowing on the surface of the object is occurring at a position of the plasma actuator on a basis of which the separation is detected.

9. An airflow separation detecting system comprising:
a plasma actuator disposed on a part of a surface of an object; and
a detecting device configured to detect that separation, from the surface of the object, of an airflow flowing on the surface of the object is occurring, in a case where an absolute value of a temporal variation rate of an electric power consumption value of the plasma actuator or an absolute value of a temporal variation rate of a current value of the plasma actuator is equal to or greater than a predetermined value, the temporal variation rate being a rate of variation relative to time, the electric power consumption value of the plasma actuator being measured under application of an alternating-current voltage having a predetermined voltage value to the plasma actuator, the current value of the plasma actuator being measured under the application of the alternating-current voltage having the predetermined voltage value to the plasma actuator.

10. An airflow separation detecting system comprising:
a first plasma actuator and a second plasma actuator that are disposed on a part of a surface of an object in a flowing direction of an airflow on the surface of the object; and
a detecting device configured to detect that separation, from the surface of the object, of the airflow flowing on the surface of the object is occurring, in a case where a first absolute value is greater than a second absolute value by a predetermined value or more, the first absolute value being an absolute value of a temporal variation rate of an electric power consumption value of the first plasma actuator or an absolute value of a temporal variation rate of a current value of the first plasma actuator at a certain timing, the second absolute value being corresponding one of an absolute value of a temporal variation rate of an electric power consumption value of the second plasma actuator and an absolute value of a temporal variation rate of a current value of the second plasma actuator at the certain timing, the temporal variation rate being a rate of variation relative to time, the electric power consumption values of the respective first and second plasma actuators being measured under application of an alternating-current voltage having a predetermined voltage value to each of the first and the second plasma actuators, the current values of the respective first and second plasma actuators being measured under the application of the alternating-current voltage having the predetermined voltage value to each of the first and the second plasma actuators.

11. The airflow separation detecting system according to claim 9, wherein the object comprises a wing of an aircraft.

12. The airflow separation detecting system according to claim 10, wherein the object comprises a wing of an aircraft.

13. An airflow separation position detecting system comprising
the airflow separation detecting system according to claim 9, wherein
the detecting device of the airflow separation detecting system is configured to detect that the separation, from the surface of the object, of the airflow flowing on the surface of the object is occurring at a position of the plasma actuator on a basis of which the separation is detected.

14. An airflow separation position detecting system comprising
the airflow separation detecting system according to claim 10, wherein
the detecting device of the airflow separation detecting system is configured to detect that the separation, from the surface of the object, of the airflow flowing on the surface of the object is occurring at a position of the plasma actuator on a basis of which the separation is detected.

15. An airflow separation position detecting system comprising
the airflow separation detecting system according to claim 11, wherein
the detecting device of the airflow separation detecting system is configured to detect that the separation, from the surface of the object, of the airflow flowing on the surface of the object is occurring at a position of the plasma actuator on a basis of which the separation is detected.

16. An airflow separation position detecting system comprising
the airflow separation detecting system according to claim 12, wherein
the detecting device of the airflow separation detecting system is configured to detect that the separation, from the surface of the object, of the airflow flowing on the surface of the object is occurring at a position of the plasma actuator on a basis of which the separation is detected.

* * * * *